United States Patent
Fukushima et al.

(10) Patent No.: US 6,251,498 B1
(45) Date of Patent: Jun. 26, 2001

(54) SOUNDPROOF HEAT SHIELD MEMBER FOR EXHAUST MANIFOLD

(75) Inventors: Koji Fukushima; Keiichi Sakashita, both of Ohgaki (JP)

(73) Assignee: Ibiden Co., Ltd., Ohgaki (JP)

( * ) Notice: Subject to any disclaimer, the term of this patent is extended or adjusted under 35 U.S.C. 154(b) by 0 days.

(21) Appl. No.: 08/299,591

(22) Filed: Sep. 1, 1994

(30) Foreign Application Priority Data

Sep. 3, 1993 (JP) .................................................. 5-243777

(51) Int. Cl.[7] ...................................................... B32B 3/24
(52) U.S. Cl. ........................ 428/164; 428/198; 428/920; 442/13; 442/16; 442/229; 442/319; 442/377; 442/378
(58) Field of Search ..................................... 428/256, 164, 428/198, 247, 920; 442/13, 16, 229, 319, 377, 378

(56) References Cited

U.S. PATENT DOCUMENTS

| | | | |
|---|---|---|---|
| 3,963,087 | * | 6/1976 | Grousseau ............................. 180/309 |
| 4,166,878 | * | 9/1979 | Thompson et al. .................. 428/256 |
| 5,139,839 | * | 8/1992 | Lim ....................................... 428/256 |
| 5,196,253 | * | 3/1993 | Mueller et al. ....................... 428/138 |

FOREIGN PATENT DOCUMENTS

| | | |
|---|---|---|
| 439 432 | 7/1991 | (EP) . |
| 2 241 987 | 3/1975 | (FR) . |
| 1-158513 | 11/1989 | (JP) . |
| 0901412 * | 2/1990 | (WO) . |

* cited by examiner

Primary Examiner—Elizabeth M. Cole
(74) Attorney, Agent, or Firm—Oliff & Berridge, PLC

(57) ABSTRACT

A soundproof heat shield member for an exhaust manifold comprises a metal substrate of a given three-dimensional shape, a nonwoven fabric disposed on a surface of the metal substrate facing an exhaust manifold, and a woven wire cloth of metal wires disposed on a surface of the nonwoven fabric and fixed to the metal substrate, and is excellent in the sound absorbing property, heat shielding property and durability.

3 Claims, 2 Drawing Sheets

FIG_1
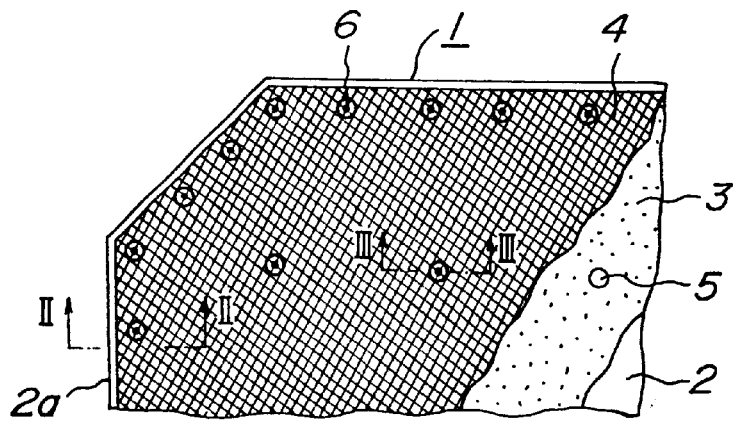
FIG_2
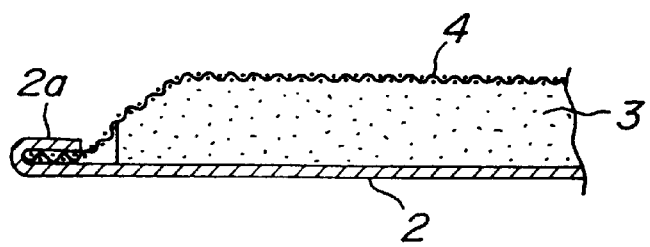
FIG_3
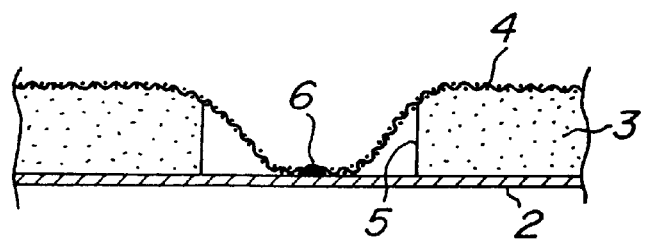

SOUNDPROOF HEAT SHIELD MEMBER FOR EXHAUST MANIFOLD

BACKGROUND OF THE INVENTION

1. Field of the Invention

This invention relates to a soundproof heat shield member having a three-dimensional shape, and more particularly to a soundproof heat shield member suitable for an exhaust manifold.

2. Description of the Related Art

In an engine room of an automobile are arranged various electronic parts for conducting engine control, run control and the like in addition to an engine. These electronic parts are exposed to a higher temperature from the engine as a heat source, so that they are protected by arranging a heat shield member onto the heat source. That is, the heat shield member is arranged around an exhaust manifold of the engine at a given distance separated therefrom to insulate heat from the electronic parts. Furthermore, the exhaust manifold is generally a noise source, so that the heat shield member is required to have a soundproof function.

As the conventional soundproof heat shield member, there have been known a single metal plate, a laminate of plural metal plates, a laminate of plural metal plates sandwiching an asbestos sheet therebetween and the like. However, the conventional soundproof heat shield members do not yet develop satisfactory soundproof function. In the conventional soundproof heat shield member, noise becomes frequently high due to solid-borne sound from the exhaust manifold. Furthermore, a space between the exhaust manifold and the soundproof heat shield member serves as a resonator, in which noise from the exhaust manifold is repeatedly reflected in the space to amplify the noise and hence the noise level in the soundproof heat shield member rises. Moreover, when the asbestos sheet is sandwiched as a sound absorbing material between the metal plates, the outer surface of the metal plate reflects noise and hence the sufficient sound absorbing effect is not obtained.

On the other hand, JP-U-1-158513 discloses a cover for exhaust manifold covering the exhaust manifold. This cover comprises an inner plate facing the exhaust manifold, an outer plate located outside the inner plate and a sound absorbing member sandwiching between the inner plate and the outer plate, in which plural openings are formed in the inner plate. In the cover of such a construction, the noise from the exhaust manifold is absorbed by the sound absorbing member through the openings of the inner plate. However, there is no consideration that the noise is repeatedly reflected on the portion of the inner plate other than the openings to amplitude the noise. In this cover, therefore, the noise control effect is low, and particularly the effect of controlling high-frequency noise is very low.

SUMMARY OF THE INVENTION

It is, therefore, an object of the invention to solve the aforementioned problems of the conventional techniques and to provide a three-dimensionally shaped soundproof heat shield member for an exhaust manifold having excellent soundproofness, heat shielding property and durability.

According to the invention, there is the provision of a soundproof heat shield member for an exhaust manifold comprising a metal substrate formed into a given three-dimensional shape, a nonwoven fabric disposed on a surface of the metal substrate facing an exhaust manifold, and a woven wire cloth of metal wires disposed on a surface of the nonwoven fabric and fixed to the metal substrate and having a wire diameter of 0.1–1 mm and an interstice of 5–100 mesh.

DESCRIPTION OF THE PREFERRED EMBODIMENTS

As the metal substrate, use may be made of steel sheet, plated steel sheet and stainless sheet having a thickness of 0.5–2 mm. When the thickness of the metal substrate is less than 0.5 mm, noise amplified by vibrations of the engine is generated and cracks are apt to be caused, while when it exceeds 2 mm, the weight becomes considerably heavy as a whole and it is difficult to reduce the weight.

The nonwoven fabric is made from inorganic fibers. As the inorganic fiber, use may be made of ceramic fiber, glass wool, silica fiber and rock wool. As the ceramic fiber, it is favorable to use alumina ceramic fiber or silica-alumina ceramic fiber. The ceramic fiber is most popular among the nonwoven fabrics capable of satisfying conditions such as density and the like as mentioned later, and is cheap in the cost and high in the safety. In case of the ceramic fiber, it is preferable to have an average fiber diameter of 1.5–20 $\mu$m and an average fiber length of not less than 5 mm. Furthermore, the ceramic fiber is excellent in the heat resistance and durability. If the demand on the heat resistance is not important, the use of glass wool is favorable from a viewpoint of the cost.

The nonwoven fabric is preferable to have an average bulk density of 0.05–0.5 g/cm$^3$, an average thickness of 0.5–15 mm and an average compressibility of not less than 1% in the assembling thereof. Moreover, the term "average compressibility" used herein means a volume ratio of the nonwoven fabric decreased by compression.

When the average bulk density is less than 0.05 g/cm$^3$, problems are caused in the durability, while when it exceeds 0.5 g/cm$^3$, there is a fear of causing poor sound absorption. When the average thickness is less than 0.5 mm, the sound absorption and heat shielding property are insufficient, while when it exceeds 15 mm, the soundproof heat shield member cannot frequently be mounted onto the engine in a restricted space of the engine room. On the other hand, when the nonwoven fabric is assembled at an average compressibility of not less than 1%, it can effectively be fixed, and consequently the position shifting or the powdering of the nonwoven fabric through vibrations of the engine can effectively be prevented.

According to the invention, the nonwoven fabric made from the inorganic fibers absorbs noise as follows: that is, gaps between the inorganic fibers in the nonwoven fabric convert sound energy entered therein into heat energy through viscous resistance of capillary action, or the fibers themselves are vibrated by sound entered to convert sound into heat energy. Thus, the inorganic fibers serve as a sound absorbing member.

On the other hand, the nonwoven fabric absorbs vibrations as follows: that is, vibration energy transmitted from the engine to the soundproof heat shield member is converted into heat energy through internal friction of the inorganic fibers. Thus, the nonwoven fabric also serves as a damping material.

The woven wire cloth is located nearest to the exhaust manifold of the engine, so that it is required to be excellent in the heat resistance and flexibility. The flexibility is required for closely fixing the nonwoven fabric to a curved surface of the three-dimensionally shaped metal substrate. Further, when the woven wire cloth is compared with the metal plate, noise from the exhaust manifold can effectively be absorbed by the nonwoven fabric through the interstices of the woven wire cloth without reflection, and also vibrations transmitted to the metal substrate can effectively be damped by the woven wire cloth.

From viewpoints of the heat resistance and flexibility, the metal wire constituting the woven wire cloth is preferable to be made from stainless steel (SUS 304), brass or galvanized steel.

In the woven wire cloth, the wire diameter is within a range of 0.1–1.0 mm, and the interstice is within a range of 5–100 mesh. When the wire diameter is less than 0.1 mm, the flexibility is excellent but the durability is insufficient, while when it exceeds 1.0 mm, the durability is excellent but the flexibility and workability are poor. Particularly, the wire diameter is preferable to be 0.2–0.3 mm.

When the interstice is less than 5 mesh, the nonwoven fabric falls off and scatters from the interstices of the woven wire cloth due to vibrations and run wind of an automobile and the like, while when it exceeds 100 mesh, noise from the exhaust manifold is reflected to decrease the sound absorbing effect. The interstice is favorable to be within a range of 40–50 mesh.

In the soundproof heat shield member according to the invention, an outermost peripheral end portion of the metal substrate may be subjected to clinching, whereby the end portion may be folded toward the nonwoven fabric and the woven wire cloth so as to cover and fix the peripheral edge portions of the nonwoven fabric and the woven wire cloth.

The projecting of the woven wire cloth and nonwoven fabric from the metal substrate in side direction is prevented by the clinching, so that the edge portions of the woven wire cloth and nonwoven fabric do not appear at the side face of the soundproof heat shield member. Therefore, when the soundproof heat shield member is assembled onto the exhaust manifold of the engine, even if hand touches the end portion of the member, there is no fear of injury or the like and the safe assembling operation can be conducted.

The fixation between the woven wire cloth and the metal substrate is carried out by spot welding, stud welding, rivet joining or eyelet joining. The rivet joining and spot welding are preferable from a viewpoint of the productivity, in which the woven wire cloth can completely be fixed to the curved surface of the metal substrate. On the other hand, the eyelet joining is favorable from a viewpoint of the durability.

In the fixation of the woven wire cloth to the metal substrate, the fixing pitch is preferable to be within a range of 10–100 mm. When the fixing pitch is less than 10 mm, the fixed portion forms sound bridge to decrease the sound absorbing effect. While, when it exceeds 100 mm, the closed state of the nonwoven fabric to the metal substrate becomes incomplete and it tends to cause the position shifting or powdering of the nonwoven fabric due to vibrations of the engine and the like.

In case of the spot welding, nugget diameter is preferable to be within a range of 2–5 mm. When the nugget diameter is less than 2 mm, the weld bonding strength between the woven wire cloth and the metal substrate is weak and the durability is poor, while when it exceeds 5 mm, there is caused a problem of sound bridge. Moreover, it is favorable that holes for the welding are previously formed in portions of the nonwoven fabric corresponding to positions to be spot welded. These holes have an opening diameter of 7–15 mm. When the opening diameter is less than 7 mm, it is difficult to insert an electrode for spot welding into the hole, while when it exceeds 15 mm, the sound absorbing effect lowers.

In case of the eyelet joining, the eyelet is desirable to have a hole diameter of not more than 10 mm. When the hole diameter is more than 10 mm, the hole itself passes noise to decrease the sound absorbing effect.

In case of the stud welding, there may be used usual stud pins of L-shaped, T-shaped, U-shaped and the like. In this case, the diameter of the stud pin is preferably within a range of 0.5–3.0 mm. When the diameter is less than 0.5 mm, the strength of the stud pin itself is insufficient, while when it exceeds 3.0 mm, there is a fear of forming sound bridge.

The nonwoven fabric is usually manufactured in form of a nonwoven short fiber sheet and punched into a given shape. On the other hand, the woven wire cloth is used for closing the nonwoven fabric to the metal substrate to absorb vibrations of the metal substrate. Therefore, if a gap is existent between the woven wire cloth and the nonwoven fabric, the closed state between the metal substrate and the nonwoven fabric becomes incomplete and hence the position shifting, powdering or scattering of the nonwoven fabric is caused due to vibrations of the engine or running automobile to considerably degrade the durability. For this end, the nonwoven fabric and the woven wire cloth are united together and fixed to the metal substrate with an adhesive. As the adhesive, an inorganic binder is preferable from a viewpoint of the heat resistance.

Moreover, the nonwoven fabric and the woven wire cloth may be united together by detachably disposing the woven wire cloth in a shaping mold used in a wet shaping process of the nonwoven fabric and then wet shaping inorganic fibers into the nonwoven fabric.

When the woven wire cloth is fixed to the metal substrate by spot welding or the like, a portion of the metal substrate to be fixed may be made convex or a portion of the woven wire cloth to be fixed may be made concave or the working of both portions to be fixed may be conducted toward the exhaust manifold in order to surely holding a space including the nonwoven fabric.

In general, commercially available nonwoven fabrics of inorganic fibers are small in the extensibility, so that if it is intended to forcedly extend the nonwoven fabric, the cracking, breakage and the like easily occur. For this end, when using such a commercial nonwoven fabric, it is advantageous to form the nonwoven fabric at a wet state. In the latter case, the extensibility is improved owing to the wet state, so that there is caused no cracking, breakage and the like even if such a nonwoven fabric is followed to the irregular or curved surfaces of the metal substrate and the woven wire cloth.

When the nonwoven fabric of glass wool, rock wool, silica-alumina ceramic fiber or the like is used under run wind, muddy water and the like in addition to vibrations of engine and the like, a part of an outer peripheral end portion of the nonwoven fabric gradually scatters or flows out if the outer peripheral end portion of the nonwoven fabric is not fixed to the metal substrate or the woven wire cloth. For this end, a portion of the nonwoven fabric ranging from the outer peripheral end to a width of 3–15 mm may be subjected to a curing treatment with an inorganic binder. As the inorganic binder, mention may be made of an aqueous solution of a clay mineral such as colloidal silica, colloidal alumina, montmorillonite or the like. For example, there is a silica sol, Snowtex (trade name, made by Nissan Kagaku Kabushiki Kaisha).

When the cured width is less than 3 mm, the cured portion is apt to be peeled off from the boundary between the cured portion and uncured portion. On the other hand, the sound absorption coefficient of the nonwoven fabric itself is degraded through the curing treatment, so that the cured width should be narrowed as far as possible or it is restricted to not more than 15 mm. Preferably, the cured width is within a range of about 8–10 mm.

The thus manufactured soundproof heat shield member is disposed so as to face the surface of the woven wire cloth to the exhaust manifold at a distance between the woven wire cloth and the exhaust manifold of 5–50 mm. When the distance is less than 5 mm, the heat shielding property and sound absorbing effect are insufficient, while when it exceeds 50 mm, the soundproof heat shield member cannot frequently be mounted onto the engine in a restricted space of the engine room. Furthermore, it is favorable that the soundproof heat shield member does not contact with the exhaust manifold.

As mentioned above, the soundproof heat shield member according to the invention is formed by uniting the nonwoven fabric and the woven wire cloth having a wire diameter of 0.1–1 mm and an interstice of 5–100 mesh together and fixing them to the metal substrate of the given shape, or by attaching the nonwoven fabric onto the metal substrate at a wet state and then disposing the woven wire cloth onto the surface of the nonwoven fabric, and disposed so as to face the nonwoven fabric and the woven wire cloth to the exhaust manifold of the engine, so that noise from the engine and the like is absorbed by the nonwoven fabric and hence such a noise is not propagated to the metal substrate. Therefore, the noise is never propagated through the metal substrate toward the outside.

Since the woven wire cloth is disposed at a side of sound source for holding the nonwoven fabric, sound from the sound source is passed through the interstices of the woven wire cloth to the nonwoven fabric, so that the sound absorbing effect of the nonwoven fabric is very effectively developed. And also, the woven wire cloth is excellent in the vibration damping effect.

On the other hand, the nonwoven fabric is excellent in the heat shielding property, so that it can easily insulate heat generated from the engine and the like, particularly high-temperature heat from the exhaust manifold.

In the soundproof heat shield member according to the invention, the nonwoven fabric is supported by the woven wire cloth as mentioned above, so that the shifting, powdering, scattering or flowing out of the nonwoven fabric is prevented to enhance the durability. Furthermore, the wearing of the nonwoven fabric is prevented because the nonwoven fabric is closely supported by the woven wire cloth and the metal substrate. Moreover, the woven wire cloth is fixed to the metal substrate by spot welding or the like, so that the assembling of the woven wire cloth and the nonwoven fabric onto the metal substrate can be ensured to easily manufacture soundproof heat shield members of complicated three-dimensional shape.

According to the invention, the soundproof heat shield members for the exhaust manifold having a three-dimensional shape and excellent sound absorbing property, heat shielding property and durability can be provided without the decrease of vibration damping property even in continuous use at a higher temperature.

The soundproof heat shield members according to the invention are applicable to high temperature parts and noise generating parts such as engine cover, muffler, turbocharger cover, catalyst convertor and the like and can develop excellent sound absorbing and heat shielding effects.

BRIEF DESCRIPTION OF THE DRAWINGS

The invention will be described with reference to the accompanying drawings, wherein:

FIG. 1 is a partially cutaway plan view of an embodiment of the soundproof heat shield member according to the invention;

FIG. 2 is a schematically partial section view taken along a line II—II of FIG. 1;

FIG. 3 is a schematically partial section view taken along a line III—III of FIG. 1;

Figure 4:
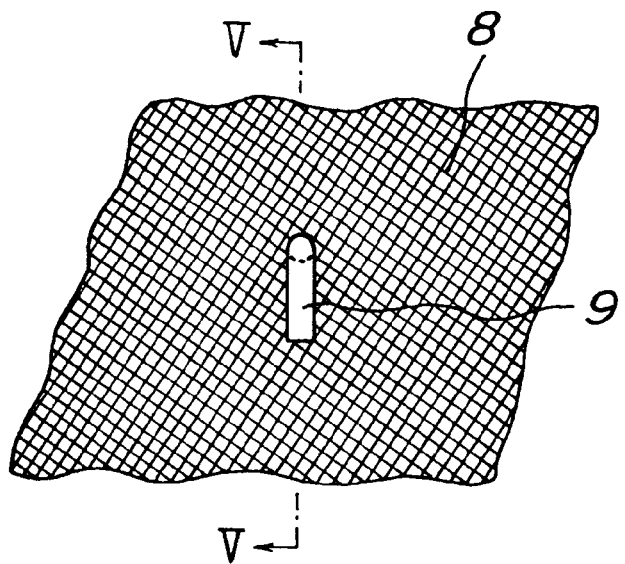
FIG. 4 is a partially cutaway plan view of another embodiment of the soundproof heat shield member according to the invention.

The following examples are given in illustration of the invention and are not intended as limitations thereof.

EXAMPLE 1

A soundproof heat shield member of this example is used for an exhaust manifold in an automobile and has a three-dimensional shape corresponding to the shape of the exhaust manifold.

As shown in FIGS. 1–3, the soundproof heat shield member 1 comprises a metal substrate 2 formed into a three-dimensional shape, a nonwoven fabric 3 disposed on a surface of the metal substrate 2 facing the exhaust manifold (not shown), and a woven wire cloth 4 disposed on the surface of the nonwoven fabric 3 and fixed to the metal substrate 2 by spot welding, in which an outermost peripheral portion of the metal substrate is subjected to clinching (2a) as shown in FIG. 2.

As shown in Table 1, an aluminum-plated steel sheet (SACD80) of 1 mm in thickness is used as the metal substrate 2, while the nonwoven fabric 3 and woven wire cloth 4 are used by integrally uniting silica-alumina ceramic fibers having an average fiber diameter of 2.2 μm and an average fiber length of 30 mm with a plain woven wire cloth of stainless steel (SUS304) having an interstice of 50 mesh and a wire diameter of 0.18 mm through wet forming process. The thus formed nonwoven fabric has an average thickness of 4 mm, an average bulk density of 0.25 g/cm$^3$ and an average compressibility of about 5% in the assembling to the metal substrate 2.

In order to fix the woven wire cloth 4 to the metal substrate 2 by spot welding, holes 5 for spot welding having a diameter of about 10 mm are formed in the nonwoven fabric 3 at a position corresponding to a fixing pitch for spot welding of 30–80 mm. A nugget diameter in a spot welded portion 6 between the metal substrate 2 and the woven wire cloth 4 is 3 mm.

The thus prepared soundproof heat shield member 1 is disposed around an exhaust manifold of a diesel engine having four cylinders and a displacement of 2000 cc at a distance between the member 1 and the manifold of 5–30 mm and then the engine is run at 4000 rpm, during which noise from the engine is measured to obtain a result as shown in Table 2. In Table 2, the measured value is an average of values measured at positions separated from the engine by 1 m in right, left, upper and front directions.

On the other hand, a strip-shaped specimen having a length of 220 mm and a width of 10 mm is cut out from the soundproof heat shield member 1 and loss factors at frequencies of the specimen are measured according to a test method for vibration damping property of steel sheet defined in JIS-G-0602 to obtain results as shown in Table 3. Further, a disc-shaped specimen is cut out from the soundproof heat shield member 1 and sound absorption coefficients at frequencies of the specimen are measured according to a test method for sound absorption of acoustical material by the tube method defined in JIS-A-1405 to obtain results as shown in Table 4.

EXAMPLES 2–9

Soundproof heat shield members having the same structure as in Example 1 are prepared by changing the thickness of the metal substrate 2, the average bulk density and thickness of the nonwoven fabric 3 and the kind, interstice and wire diameter of the woven wire cloth 4, respectively, as shown in Table 1, and then the loss factors and sound absorption coefficients at frequencies thereof are measured in the same manner as in Example 1 to obtain results as shown in Tables 3 and 4.

EXAMPLE 10

Figure 5:
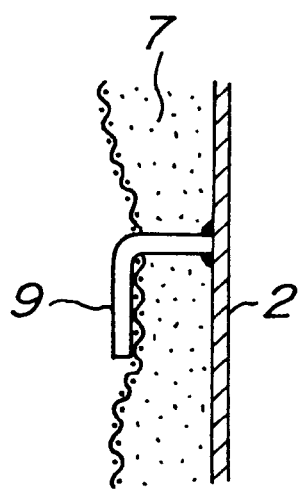
FIG. 5 is a schematically partial section view taken along a line V—V of FIG. 4.

As shown in FIGS. 4 and 5, a nonwoven fabric 7 of 5 mm in average thickness formed by shaping silica-alumina ceramic fibers having an average fiber diameter of 2.2 μm and an average fiber length of 30 mm into a sheet is fixed to the same metal substrate 2 as in Example 1 together with a plain woven wire cloth 8 of stainless steel (SUS304) having an interstice of 10 mesh and a wire diameter of 0.8 mm by stud welding to prepare a soundproof heat shield member. In this case, stud pins of 2 mm in diameter are vertically welded on the metal substrate 2 at a fixing pitch of 50 mm and the nonwoven fabric 7 and the woven wire cloth 8 are put therein and then each top of these pins is folded in a horizontal direction so that the average compressibility of the nonwoven fabric is about 5%.

The thus prepared soundproof heat shield member is disposed around an exhaust manifold of a diesel engine having four cylinders and a displacement of 2000 cc at a distance between the member and the manifold of 5–30 mm and then the engine is run at 4000 rpm, during which noise from the engine is measured in the same manner as in Example 1 to obtain a result as shown in Table 2. Furthermore, the loss factors and sound absorption coefficient at frequencies are measured in the same manner as in Example 1 to obtain results as shown in Tables 3 and 4.

EXAMPLE 11

A soundproof heat shield member is prepared in the same manner as in Example 10 except that stainless steel plate (SUS304) is used as a metal substrate and a lass wool mat formed by subjecting glass fibers to a needle punching treatment (made by Nakagawa Sangyo Kabushiki Kaisha) is used as a nonwoven fabric. The thus prepared soundproof heat shield member is disposed around an exhaust manifold of a diesel engine having four cylinders and a displacement of 2000 cc at a distance between the member and the manifold of 5–30 mm and then the engine is run at 4000 rpm, during which noise from the engine is measured in the same manner as in Example 1 to obtain a result as shown in Table 2. Furthermore, the loss factors and sound absorption coefficients at frequencies are measured in the same manner as in Example 1 to obtain results as shown in Tables 3 and 4.

In the assembling of the nonwoven fabric, the average thickness is 12 mm, the average bulk density is 0.08 g/cm$^3$, and the average compressibility is about 5%.

EXAMPLE 12

A soundproof heat shield member is prepared in the same manner as in Example 1 except that the woven wire cloth is fixed to the metal substrate with eyelets of stainless steel (SUS 304) (hole diameter: 5 mm). The thus prepared soundproof heat shield member is disposed around an exhaust manifold of a diesel engine having four cylinders and a displacement of 2000 cc at a distance between the member and the manifold of 5–30 mm and then the engine is run at 4000 rpm, during which noise from the engine is measured in the same manner as in Example 1 to obtain a result as shown in Table 2. Furthermore, the loss factors and sound absorption coefficients at frequencies are measured in the same manner as in Example 1 to obtain results as shown in Tables 3 and 4.

Moreover, a portion of the nonwoven fabric ranging from the outer peripheral end to a width of 10 mm is subjected to a curing treatment with colloidal silica having a solid content of 10%.

COMPARATIVE EXAMPLE 1

A soundproof heat shield member is prepared in the same manner as in Example 1 except that the nonwoven fabric as described in Example 10 is used and a punching metal of aluminum-plated steel (opening diameter: 6 mm, opening ratio: 30%) is used instead of the woven wire cloth. Moreover, the punching metal is fixed at its outer peripheral portion to the metal substrate by spot welding.

The thus prepared soundproof heat shield member is disposed around an exhaust manifold of a diesel engine having four cylinders and a displacement of 2000 cc at a distance between the member and the manifold of 5–30 mm and then the engine is run at 4000 rpm, during which noise from the engine is measured in the same manner as in Example 1 to obtain a result as shown in Table 2. Furthermore, the loss factors and sound absorption coefficients at frequencies are measured in the same manner as in Example 1 to obtain results as shown in Tables 3 and 4.

COMPARATIVE EXAMPLE 2

A soundproof heat shield member is prepared by piling two aluminum-plated steel sheets (thickness: 0.6 mm) one upon the other and joining them at their outer peripheral portions through spot welding without using the nonwoven fabric. The thus prepared soundproof heat shield member is disposed around an exhaust manifold of a diesel engine having four cylinders and a displacement of 2000 cc at a distance between the member and the manifold of 5–30 mm and then the engine is run at 4000 rpm, during which noise from the engine is measured in the same manner as in Example 1 to obtain a result as shown in Table 2. Furthermore, the loss factors and sound absorption coefficients at frequencies are measured in the same manner as in Example 1 to obtain results as shown in Tables 3 and 4.

TABLE 1

|  | | Metal substrate | | Nonwoven fabric | | | |
| --- | --- | --- | --- | --- | --- | --- | --- |
|  | No. | kind | thickness (mm) | kind | average bulk density (g/cm$^3$) | average thickness (mm) | average compressibility (%) |
| Example | 1 | aluminum-plated steel sheet (SACD80) | 1 | silica-alumina ceramic fiber | 0.25 | 4 | 5 |
|  | 2 | aluminum-plated steel sheet (SACD80) | 0.6 | silica-alumina ceramic fiber | 0.25 | 4 | 5 |
|  | 3 | aluminum-plated steel sheet (SACD80) | 1.8 | silica-alumina ceramic fiber | 0.25 | 4 | 5 |
|  | 4 | aluminum-plated steel sheet (SACD80) | 1 | silica-alumina ceramic fiber | 0.1 | 15 | 1.5 |
|  | 5 | aluminum-plated steel sheet (SACD80) | 1 | silica-alumina ceramic fiber | 0.4 | 1 | 1.5 |
|  | 6 | aluminum-plated steel sheet (SACD80) | 1 | silica-alumina ceramic fiber | 0.25 | 4 | 5 |
|  | 7 | aluminum-plated steel sheet (SACD80) | 1 | silica-alumina ceramic fiber | 0.25 | 4 | 5 |
|  | 8 | aluminum-plated steel sheet (SACD80) | 1 | silica-alumina ceramic fiber | 0.25 | 4 | 5 |
|  | 9 | aluminum-plated steel sheet (SACD80) | 1 | silica-alumina ceramic fiber | 0.25 | 4 | 5 |
|  | 10 | aluminum-plated steel sheet (SACD80) | 1 | silica-alumina ceramic fiber | 0.25 | 4 | 5 |
|  | 11 | SUS 304 | 1 | glass wool | 0.08 | 12 | 5 |
|  | 12 | aluminum-plated steel sheet (SACD80) | 1 | silica-alumina ceramic fiber | 0.25 | 4 | 5 |
| Comparative Example | 1 | aluminum-plated steel sheet (SACD80) | 1 | silica-alumina ceramic fiber | 0.4 | 1 | 5 |
|  | 2 | aluminum-plated steel sheet (SACD80) | 0.6 | — | — | — | — |

|  | | Woven wire cloth | | | Process for fixing woven wire cloth | | | Distance between |
| --- | --- | --- | --- | --- | --- | --- | --- | --- |
|  | No. | kind | interstice (mesh) | wire diameter (mm) | fixing means | fixing pitch (mm) | nugget diameter (mm) | woven wire cloth and exhaust manifold (mm) |
| Example | 1 | SUS 304 | 50 | 0.18 | spot welding | 30–80 | 3 | 5–30 |
|  | 2 | SUS 304 | 50 | 0.18 | spot welding | 30–80 | 3 | 5–30 |
|  | 3 | SUS 304 | 50 | 0.18 | spot welding | 30–80 | 3 | 5–30 |
|  | 4 | SUS 304 | 50 | 0.18 | spot welding | 30–80 | 3 | 5–30 |
|  | 5 | SUS 304 | 50 | 0.18 | spot welding | 30–80 | 3 | 5–30 |
|  | 6 | SUS 304 | 10 | 0.8 | spot welding | 30–80 | 3 | 5–30 |
|  | 7 | SUS 304 | 80 | 0.1 | spot welding | 30–80 | 3 | 5–30 |

TABLE 1-continued

|  |  |  |  |  |  |  |  |  |
|---|---|---|---|---|---|---|---|---|
|  | 8 | brass | 50 | 0.18 | spot welding | 30–80 | 3 | 5–30 |
|  | 9 | galvanized steel | 50 | 0.18 | spot welding | 30–80 | 3 | 5–30 |
|  | 10 | SUS 304 | 10 | 0.8 | stud welding | 50 | diameter of stud pin 2 mm | 5–30 |
|  | 11 | SUS 304 | 10 | 0.8 | stud welding | 50 | diameter of stud pin 2 mm | 5–30 |
|  | 12 | SUS 304 | 50 | 0.18 | eyelet | 50 | hole diameter 5 mm | 5–30 |
| Comparative Example | 1 | — | — | — | spot welding | 50 | 3 | 5–30 |
|  | 2 | — | — | — | spot welding | 50 | 3 | 5–30 |

TABLE 2

|  | Noise (dB) |
|---|---|
| Example 1 | 90.8 |
| Example 10 | 91.0 |
| Example 11 | 91.6 |
| Example 12 | 91.9 |
| Comparative Example 1 | 92.5 |
| Comparative Example 2 | 93.6 |

TABLE 3

|  | Lost factor ||||
|---|---|---|---|---|
|  | 174 Hz | 410 Hz | 617 Hz | 800 Hz |
| Example 1 | 0.237 | 0.258 | 0.274 | 0.211 |
| Example 2 | 0.223 | 0.237 | 0.258 | 0.201 |
| Example 3 | 0.243 | 0.262 | 0.282 | 0.215 |

TABLE 3-continued

|  | Lost factor ||||
|---|---|---|---|---|
|  | 174 Hz | 410 Hz | 617 Hz | 800 Hz |
| Example 4 | 0.256 | 0.271 | 0.289 | 0.234 |
| Example 5 | 0.203 | 0.209 | 0.218 | 0.183 |
| Example 6 | 0.225 | 0.234 | 0.260 | 0.208 |
| Example 7 | 0.221 | 0.231 | 0.248 | 0.199 |
| Example 8 | 0.225 | 0.237 | 0.258 | 0.200 |
| Example 9 | 0.224 | 0.236 | 0.257 | 0.203 |
| Example 10 | 0.228 | 0.239 | 0.265 | 0.223 |
| Example 11 | 0.230 | 0.243 | 0.265 | 0.214 |
| Example 12 | 0.221 | 0.223 | 0.239 | 0.185 |
| Comparative Example 1 | 0.173 | 0.162 | 0.171 | 0.017 |
| Comparative Example 2 | 0.158 | 0.143 | 0.152 | 0.009 |

TABLE 4

|  | Sound absorption coefficient (%) ||||||||
|---|---|---|---|---|---|---|---|---|
|  | 200 Hz | 250 Hz | 315 Hz | 400 Hz | 500 Hz | 630 Hz | 800 Hz | 1000 Hz |
| Example 1 | 8 | 8 | 10 | 8 | 7 | 10 | 14 | 16 |
| Example 2 | 8 | 8 | 10 | 8 | 7 | 10 | 14 | 16 |
| Example 3 | 8 | 8 | 10 | 8 | 7 | 10 | 14 | 16 |
| Example 4 | 10 | 11 | 13 | 11 | 10 | 16 | 19 | 21 |
| Example 5 | 2 | 2 | 4 | 2 | 2 | 3 | 4 | 4 |
| Example 6 | 8 | 8 | 10 | 8 | 7 | 10 | 14 | 16 |
| Example 7 | 8 | 8 | 10 | 8 | 7 | 10 | 13 | 15 |
| Example 8 | 8 | 8 | 10 | 8 | 7 | 10 | 14 | 16 |
| Example 9 | 8 | 8 | 10 | 8 | 7 | 10 | 14 | 16 |
| Example 10 | 7 | 6 | 8 | 6 | 7 | 10 | 12 | 15 |
| Example 11 | 7 | 6 | 8 | 6 | 7 | 10 | 12 | 15 |
| Example 12 | 8 | 8 | 10 | 8 | 7 | 10 | 14 | 16 |
| Comparative Example 1 | 7 | 6 | 7 | 5 | 6 | 8 | 10 | 12 |
| Comparative Example 2 | 0 | 0 | 0 | 0 | 0 | 0 | 0 | 0 |

|  | Sound absorption coefficient (%) |||||||
|---|---|---|---|---|---|---|---|
|  | 1250 Hz | 1600 Hz | 2000 Hz | 2500 Hz | 3150 Hz | 4000 Hz | 5000 Hz |

TABLE 4-continued

| | | | | | | | |
|---|---|---|---|---|---|---|---|
| Example 1 | 21 | 30 | 36 | 34 | 40 | 47 | 61 |
| Example 2 | 21 | 30 | 36 | 34 | 40 | 47 | 61 |
| Example 3 | 21 | 30 | 36 | 34 | 40 | 47 | 61 |
| Example 4 | 30 | 42 | 50 | 51 | 57 | 61 | 80 |
| Example 5 | 5 | 8 | 9 | 9 | 10 | 12 | 20 |
| Example 6 | 21 | 30 | 36 | 34 | 40 | 47 | 61 |
| Example 7 | 20 | 28 | 35 | 32 | 39 | 45 | 57 |
| Example 8 | 21 | 30 | 36 | 34 | 40 | 47 | 61 |
| Example 9 | 21 | 30 | 36 | 34 | 40 | 47 | 61 |
| Example 10 | 18 | 23 | 30 | 27 | 32 | 39 | 54 |
| Example 11 | 18 | 23 | 30 | 27 | 32 | 39 | 54 |
| Example 12 | 21 | 30 | 36 | 34 | 40 | 47 | 61 |
| Comparative Example 1 | 14 | 19 | 20 | 25 | 23 | 26 | 28 |
| Comparative Example 2 | 0 | 0 | 0 | 0 | 0 | 0 | 0 |

What is claimed is:

1. A soundproof heat shield member for an exhaust manifold, comprising:
   a metal substrate formed into a given three-dimensional shape, the metal substrate having a thickness of 0.5–2 mm and selected from a group consisting of steel sheet, plated steel sheet and stainless steel sheet;
   a nonwoven fabric disposed on a surface of the metal substrate facing the exhaust manifold, the fabric comprises at least one inorganic fiber selected from a group consisting of ceramic fiber, glass wool, silica fiber and rock wool; and
   a woven wire cloth of metal wires with an interstice of 5–100 mesh disposed on a surface of the nonwoven fabric and fixed to the metal substrate, the metal wires selected from a group consisting of stainless steel, brass and galvanized steel and having a wire diameter of 0.1–1 mm.

2. The soundproof heat shield member according to claim 1, wherein the nonwoven fabric has an average bulk density of 0.05–0.5 g/cm$^3$, an average thickness of 0.5–15 mm and an average compressibility of not less than 1%.

3. The soundproof heat shield member according to claim 1, wherein the woven wire cloth is fixed to the metal substrate at a fixing pitch of 10–100 mm and disposed at a distance between the woven wire cloth and the exhaust manifold of 5–50 mm.

* * * * *